US010382587B2

(12) United States Patent
Kohl et al.

(10) Patent No.: US 10,382,587 B2
(45) Date of Patent: Aug. 13, 2019

(54) DE-DUPLICATING REMOTE PROCEDURE CALLS

(71) Applicant: International Business Machines Corporation, Armonk, NY (US)

(72) Inventors: John T. Kohl, Arlington, MA (US); Shailaja S. Golikeri, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 14/751,275

(22) Filed: Jun. 26, 2015

(65) Prior Publication Data

US 2016/0381182 A1 Dec. 29, 2016

(51) Int. Cl.
*H04L 29/06* (2006.01)
*H04L 12/861* (2013.01)

(52) U.S. Cl.
CPC .......... *H04L 67/40* (2013.01); *H04L 49/9047* (2013.01)

(58) Field of Classification Search
CPC ........................... H04L 67/40; H04L 49/9047
See application file for complete search history.

(56) References Cited

U.S. PATENT DOCUMENTS

| 5,630,049 A * | 5/1997 | Cardoza ............... G06F 11/3664 714/25 |
| 5,675,796 A * | 10/1997 | Hodges ................... G06F 9/547 707/999.008 |
| 5,802,298 A * | 9/1998 | Imai ......................... G06F 9/543 709/217 |
| 6,289,390 B1 * | 9/2001 | Kavner .................... G06F 9/547 709/200 |
| 7,047,536 B1 * | 5/2006 | Duncan .................... G06F 9/547 709/217 |
| 7,853,962 B1 | 12/2010 | Romano et al. |
| 9,021,297 B1 * | 4/2015 | Hayes ................. G06F 11/1666 714/6.3 |
| 2001/0011296 A1 * | 8/2001 | Chidambaran ......... H04L 29/06 709/203 |
| 2006/0056413 A1 * | 3/2006 | Ikeda ....................... G06F 9/546 370/392 |
| 2007/0089118 A1 * | 4/2007 | Aizaki .................... G06F 9/547 719/330 |
| 2011/0125986 A1 * | 5/2011 | Reid ........................ G06F 9/547 712/203 |

FOREIGN PATENT DOCUMENTS

CN 103746843 A 4/2014

\* cited by examiner

*Primary Examiner* — Azizul Choudhury
(74) *Attorney, Agent, or Firm* — Brian J. Colandreo, Esq.; Jeffrey T. Placker, Esq.; Holland & Knight LLP

(57) ABSTRACT

A method, computer program product, and a computing system are provided for de-duplicating remote procedure calls at a client. In an implementation, the method may include generating a plurality of local pending remote procedure calls. The method may also include identifying a set of duplicate remote procedure calls among the plurality of remote procedure calls. The method may also include associating each remote procedure call within the set of duplicate remote procedure calls with one another. The method may also include executing a remote procedure call of the set of duplicate remote procedure calls. The method may further include providing a response for the remote procedure call of the set of duplicate remote procedure calls with the other remote procedure calls of the set of duplicate remote procedure calls.

14 Claims, 3 Drawing Sheets

DE-DUPLICATING REMOTE PROCEDURE CALLS

TECHNICAL FIELD

The present disclosure generally relates to systems and method for managing remote procedure calls, and more particularly relates to managing remote procedure calls at a client to reduce or eliminate duplicate remote procedure calls.

BACKGROUND

A remote procedure call (RPC) may generally include an inter-process communication that may allow a computer program to cause procedure to execute on another computer, or to request information from another computer. An RPC may be initiated by a client, and may include a request message being transmitted to a remote server to execute the procedure or to request the needed information. The remote server may transmit a response including the needed information back to the requesting client. Because the RPC is being transmitted to the remote server, executed by the remote server, and a response is being transmitted from the remote server back to the requesting client, each RPC may not only utilize resources of the remote server, but may also place demands on the network bandwidth. In some situations, e.g., as with multi-threaded processes, multiple threads may request the same remote procedure call, e.g., by requesting the same information from the server, etc. As such, the same request to, and response from, the remote server may be transmitted through the network, thereby placing additional demands on the network bandwidth. Similarly, in some situations the remote server may separately process each of the redundant requests, which may place additional demands on the processing capacity of the remote server.

SUMMARY OF DISCLOSURE

According to an implementation, a computer-implemented method may include generating, on a processor, a plurality of local pending remote procedure calls. The method may also include identifying, on the processor, a set of duplicate remote procedure calls among the plurality of remote procedure calls. The method may also include associating, on the processor, each remote procedure call within the set of duplicate remote procedure calls with one another. The method may also include executing, on the processor, a remote procedure call of the set of duplicate remote procedure calls. The method may further include providing, on the processor, a response for the remote procedure call of the set of duplicate remote procedure calls to the other remote procedure calls of the set of duplicate remote procedure calls.

One or more of the following features may be included. Each generated remote procedure call queued in a queue for execution by a thread pool. Identifying the set of duplicate remote procedure calls may include evaluating a generated remote procedure call of the plurality of remote procedure calls to determine if the generated remote procedure call is a duplicate of another pending remote procedure call. The method may also include classifying the generated remote procedure call as unique when the generated remote procedure call is not a duplicate of another pending remote procedure call. The method may also include classifying the generated remote procedure call a duplicate when the generated remote procedure call is a duplicate of another pending remote procedure call.

Executing the remote procedure call of the set of duplicate remote procedure calls may include transmitting the remote procedure call to a remote server. At least one of the remote procedure calls may include a foreground request and at least one of the remote procedure calls may include a background request. The foreground remote procedure call may be given priority over each background remote procedure call.

According to another implementation, a computer program product may include a non-transitory computer readable medium having a plurality of instructions stored on it. When executed by a processor the instructions may cause the processor to perform operations including generating a plurality of local pending remote procedure calls. Instructions may also be included for identifying a set of duplicate remote procedure calls among the plurality of remote procedure calls. Instructions may also be included for associating each remote procedure call within the set of duplicate remote procedure calls with one another. Instructions may also be included for executing a remote procedure call of the set of duplicate remote procedure calls. Instructions may further be included for providing a response for the remote procedure call of the set of duplicate remote procedure calls to the other remote procedure calls of the set of duplicate remote procedure calls.

One or more of the following features may be included. Instructions may be included for queuing each generated remote procedure call in a queue for execution by a thread pool. The instructions for identifying the set of duplicate remote procedure calls may include instructions for evaluating a generated remote procedure call of the plurality of remote procedure calls to determine if the generated remote procedure call is a duplicate of another pending remote procedure call. Instructions may be included for classifying the generated remote procedure call as unique when the generated remote procedure call is not a duplicate of another pending remote procedure call. Instructions may be included for classifying the generated remote procedure call as duplicate when the generated remote procedure call is a duplicate of another pending remote procedure call.

The instructions for executing the remote procedure call of the set of duplicate remote procedure calls may include instructions for transmitting the remote procedure call to a remote server. At least one of the remote procedure calls may include a foreground request and at least one of the remote procedure calls may include a background request. The foreground remote procedure call may be given priority over each background remote procedure call.

According to yet another implementation, a computing system may include a processor device, and a memory architecture coupled with the processor device. The processor device may be configured for generating a plurality of local pending remote procedure calls. The processor device may also be configured for identifying a set of duplicate remote procedure calls among the plurality of remote procedure calls. The processor device may also be configured for associating each remote procedure call within the set of duplicate remote procedure calls with one another. The processor device may also be configured for executing a remote procedure call of the set of duplicate remote procedure calls. The processor device may further be configured for providing a response for the remote procedure call of the set of duplicate remote procedure calls to the other remote procedure calls of the set of duplicate remote procedure calls.

One or more of the following features may be included. The processor device may be further configured for queuing each generated remote procedure call in a queue for execution by a thread pool. The processor device configured for identifying the set of duplicate remote procedure calls may be further configured for evaluating a generated remote procedure call of the plurality of remote procedure calls to determine if the generated remote procedure call is a duplicate of another pending remote procedure call. The processor device may be further configured for classifying the generated remote procedure call as unique when the generated remote procedure call is not a duplicate of another pending remote procedure call. The processor device may also be configured for classifying the generated remote procedure call a duplicate when the generated remote procedure call is a duplicate of another pending remote procedure call.

At least one of the remote procedure calls may include a foreground request and at least one of the remote procedure calls may include a background request. The foreground remote procedure call may be given priority over each background remote procedure call.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
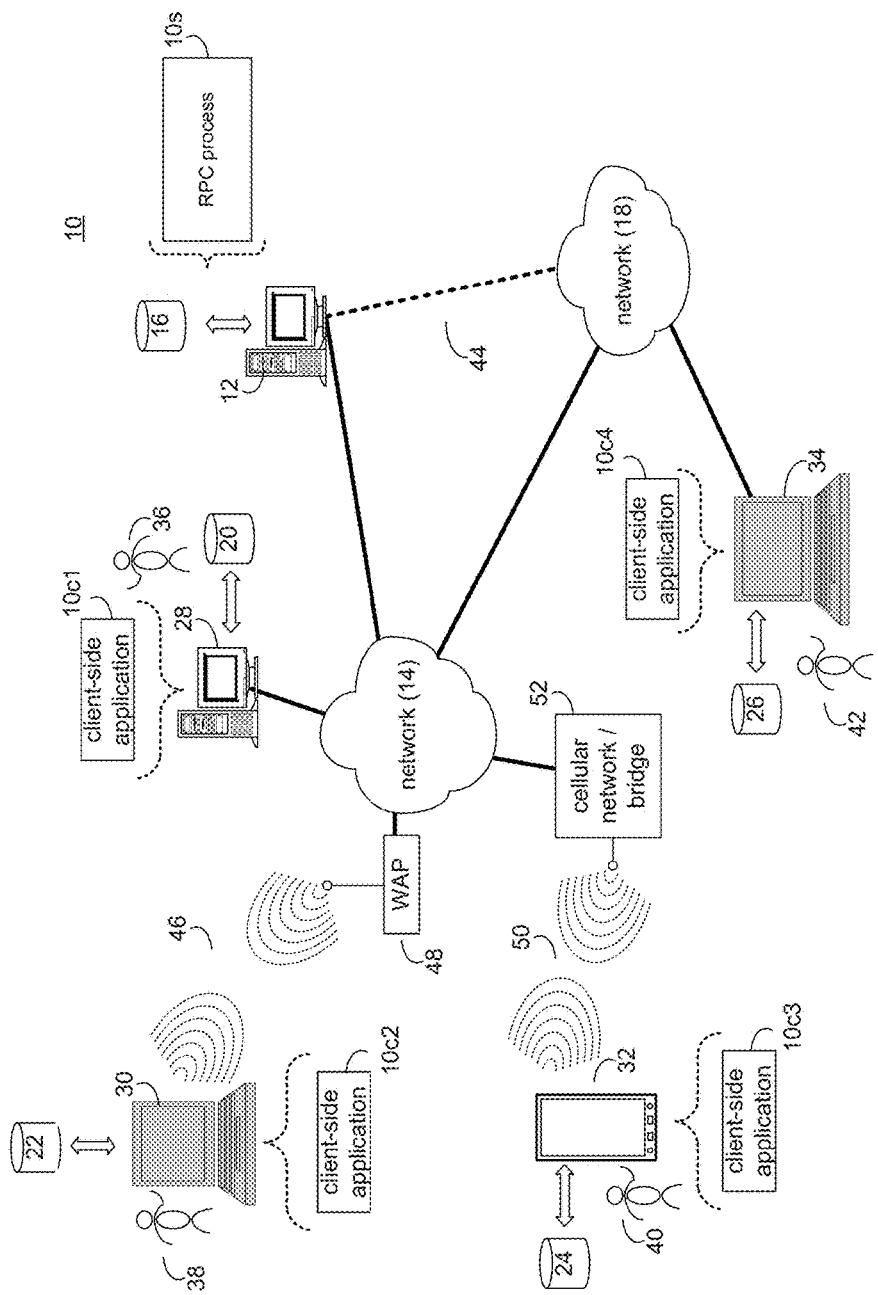
FIG. 1 is a diagrammatic view of a distributed computing network including a computing device that executes a RPC process according to an implementation of the present disclosure.

Computer programs may often request information from remote servers, and/or make requests for processes to be executed by remote servers. In some situations, e.g., as with multi-threaded processes, multiple threads may request the same remote procedure call, e.g., by requesting the same information from the server, etc. As such, the same request to, and response from, the remote server may be transmitted through the network, thereby placing additional demands on the network bandwidth. Similarly, in some situations the remote server may separately process each of the redundant requests, which may place additional demands on the processing capacity of the remote server. According to some implementations, the present disclosure may reduce and/or eliminate duplicate RPC's (e.g., which may also be referred to as requests) from being transmitted to a remote server from a client. For example, in an embodiment, a duplicate detection and queuing mechanisms may be utilized on the client (e.g., the computing device upon which the RPC's may originate) to de-duplicate multiple equivalent RPC's. Equivalent, or duplicate, RPC's may include requests for the same data or information from a server (e.g., a computing device that may be separate from the client, and that may response to the RPC's) even if the requests are not explicitly identical.

According to some embodiments, multiple different RPC's may be generated on the client, and may be pending requests, e.g., awaiting forwarding (e.g., transmission of the request) to the server, and/or awaiting a response from the remote server (e.g., the computing device from which the information may be requested, also generally referred to as "the server"). The generated requests may be queued for forwarding to the remote server. The queued requests may be evaluated to identify duplicate requests among the queued requests (e.g., which may be awaiting forwarding to the server and/or which may have been forwarded to the server and are awaiting a response from the server). The duplicate requests may be linked (e.g., some indication that the requests are duplicates may be associated with each request). In an embodiment, only the duplicate RPC having the earliest position in the queue may be executed. Although, in other embodiments, a duplicate request other than the earliest queued request may be executed. When the first request has been completed (e.g., a response from the server has been received by the client), the results of the request may be shared with the remaining duplicate requests (e.g., all of the duplicate requests may receive the same results).

Significantly, in some embodiments the process may be implemented on the client, e.g., such that duplicate requests are not transmitted to, nor serviced, or responded to, by the server. Accordingly, in some embodiments the present disclosure may save network bandwidth (e.g., by reducing the number of RPC's sent over the network), and may save time (e.g., as only one reply from the remote server is needed to satisfy all of the duplicate RPC's, and therefore the other requests do not need to wait for their own individual reply from the server). In some embodiments, the present disclosure may aid the client in maintaining strict ordering of RPC replies, for example, because removing duplicate RPC's may allow the client to process the RPC's in a reliable order of queuing from the perspective of the client (e.g., as compared to an order based on server replies which may arrive in a different order). Additionally, in some embodiments, the present disclosure may allow foreground requests and background request in a more efficient manner, and may prevent queue deadlocks or starvation.

Referring to FIG. 1, there is shown RPC process 10. For the following discussion, it is intended to be understood that RPC process 10 may be implemented in a variety of ways. For example, RPC process 10 may be implemented as a purely client-side process via one or more of client-side application 10c1, client-side application 10c2, client-side application 10c3, and client-side application 10c4. Alternatively, RPC process 10 may be implemented as a server-side/client-side process via server-side RPC process 10s in combination with one or more of client-side application 10c1, client-side application 10c2, client-side application 10c3, and client-side application 10c4. In such an example, at least a portion of the functionality of RPC process 10 may be performed by RPC process 10s and at least a portion of the functionality of RPC process 10 may be performed by one or more of client-side application 10c1, 10c2, 10c3, and 10c3.

Accordingly, RPC process 10 as used in this disclosure may include any combination of RPC process 10s, client-side application 10c1, client-side application 10c2, client-side application 10c3, and client-side application 10c4.

Figure 2:
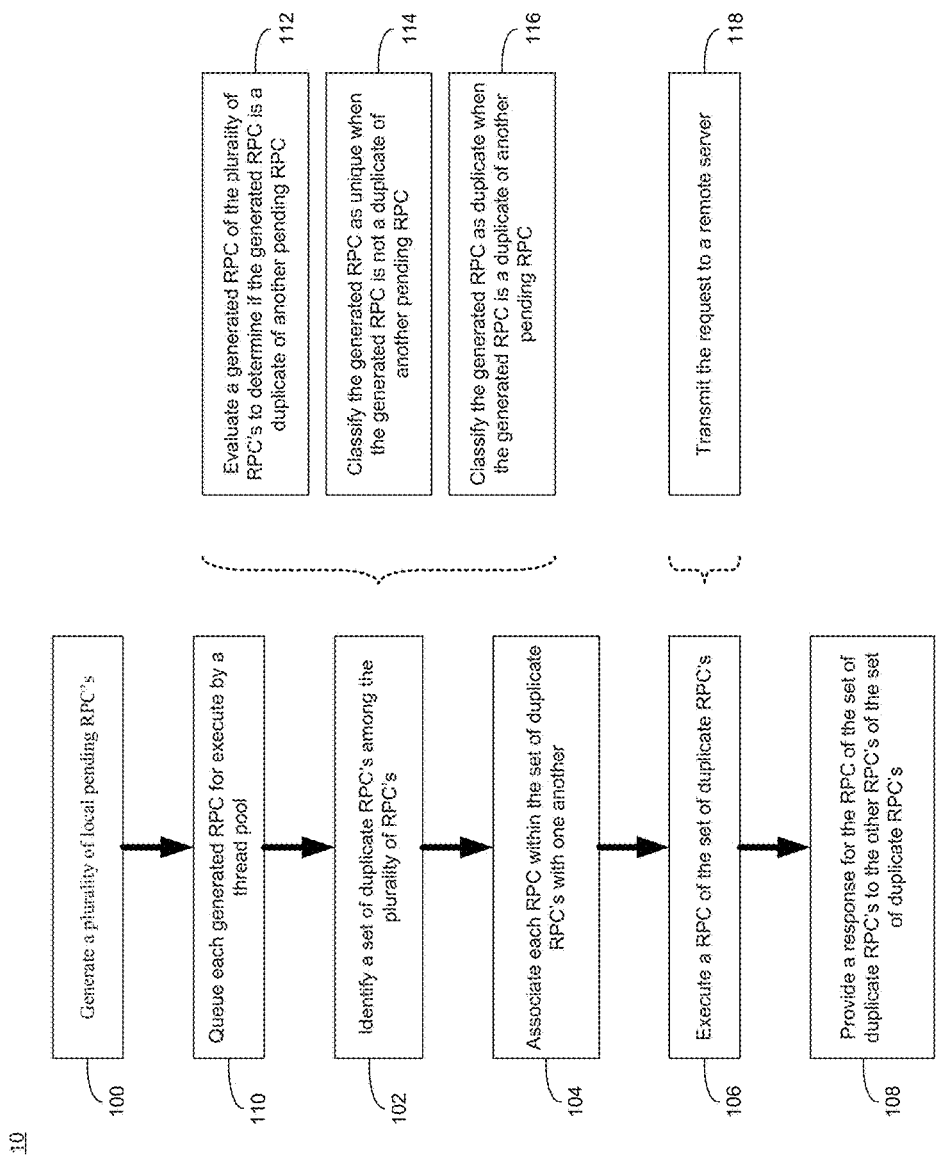
FIG. 2 is a flowchart of the RPC process of FIG. 1, according to an implementation of the present disclosure.

Referring also to FIG. 2, and as will be discussed in greater detail below, RPC process 10 may generate 100 a plurality of local pending remote procedure calls. RPC process 10 may also identify 102 a set of duplicate remote procedure calls among the plurality of remote procedure calls. RPC process 10 may also associate 104 each remote procedure call within the set of duplicate remote procedure calls with one another. RPC process 10 may also execute 106 a remote procedure call of the set of duplicate remote procedure calls. RPC process 10 may further provide 108 a response for the remote procedure call of the set of duplicate remote procedure calls to the other remote procedure calls of the set of duplicate remote procedure calls.

One or more components or modules of RPC process 10s may be a server application and may reside on and may be executed by computing device 12, which may be connected to network 14 (e.g., a wide area network, a local area network or the Internet). Examples of computing device 12 may include, but are not limited to: a personal computer, a server computer, a series of server computers, a mini computer, a mainframe computer, or a dedicated network device.

The instruction sets and subroutines of RPC process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, a source code management application, a lifecycle management application, a software development application, or a specialized application. The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access RPC process 10 directly through network 14 or through secondary network 18. Further, RPC process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

As generally discussed above with reference to FIG. 2, RPC process 10 may generate 100 a plurality of local pending remote procedure calls. RPC process 10 may also identify 102 a set of duplicate remote procedure calls among the plurality of remote procedure calls. RPC process 10 may also associate 104 each remote procedure call within the set of duplicate remote procedure calls with one another. RPC process 10 may also execute 106 a remote procedure call of the set of duplicate remote procedure calls. RPC process 10 may further provide 108 a response for the remote procedure call of the set of duplicate remote procedure calls to the other remote procedure calls of the set of duplicate remote procedure calls.

In an example implementation, a multi-threaded process and/or one or more different processes (e.g., software applications) may be executed by a client computing device. As generally discussed above, the client computing device (also referred to herein as the "client") may be a device upon which the process, or processes, may be executed. During the execution of the process, services or data may be required from a remote server. As also generally discussed above, the remote server (which may also be referred to herein as imply the "server"), may include a computing device other than the client computing device from which services or information may be requested by the process. The client and the server may be in communication via one or more computing networks, such as a local area network, a wide area network, the Internet, and/or another computing network. The services or data required by the executing process may be requested by way of a remote procedure call (also referred to herein as an "RPC" or a "request"). The various requests for information from the executing process may be managed by a request manager on the client, which may include RPC process 10. In response to the various requests for information from the executing process, RPC process 10 may generate 100 a plurality of local pending remote procedure calls at the client. Each of the plurality of local pending remote procedure calls may correspond to a separate request for information from the one or more executing processes.

Each generated remote procedure call is queued 110 in a queue for execution by a thread pool. That is, as each of the plurality of remote procedure calls is generated, the remote procedure call may be placed in a queue on the client for execution, e.g., sending request to the remote server. The order, or priority, or the remote procedure calls queued 110 by RPC process 10 may vary according to different priority schemes. For example, requests from some certain processes may be given priority over requests from certain other processes, requests may be handled in a first-in-first out manner, etc. As such, in some embodiments, the priority of the various remote procedure calls may be managed.

In some implementations, requests may be queued 110 depending upon whether the remote procedure call is a foreground request or a background request. For example, in an embodiment at least one of the remote procedure calls may include a foreground request and at least one of the remote procedure calls may include a background request. In general, a foreground request may include a request for information that a process may be awaiting to continue execution. For example, a foreground request may include a request for information to populate a graphical user interface that may be rendered by the process. As such, to complete rendering of the graphical user interface, the process may require the information requested by the foreground request. In a generally corresponding manner, a background request may include a request for information that may be anticipated by the process as being needed at a future time. As such, continued execution of the process may be awaiting a response to the background request. In one such implementation, foreground requests and back ground requests may be segregated in the RPC queue, and/or may reside in separate RPC queues. In an embodiment, a foregoing remote procedure call may be given priority of execution over each background remote procedure call.

In some implementations, RPC process 10 may employ suitable accounting mechanisms in the thread pool to reduce or eliminate situations of deadlock and starvation. For example, at least one thread of the thread pool may process background requests, e.g., without being preempted in favor of a foreground request. As such, any request that may be dependent upon a background request will eventually be completed by the thread pool. As such, while foreground requests may be prioritized by the thread pool over background requests, progress on processing the background requests within the queue may continue to prevent starvation of progress on the background requests.

RPC process 10 may also identify 102 a set of duplicate remote procedure calls among the plurality of remote procedure calls. The set of duplicate remote procedure calls may include two or more remote procedure calls that are duplicates of one another. As generally discussed above, two, or more, remote procedure calls may be considered duplicates if they are equivalent in that a response to each request would return the same data from the server. RPC process may identify 102 a set of duplicate remote procedure calls by evaluating 112 each generated remote procedure call that is added to the RPC queue. For example, once a remote procedure call is queued 110, the RPC process 10 may evaluate 112 the remote procedure call to determine if the remote procedure call added to the RPC queue is a duplicate of another pending remote procedure call that is already present on the RPC queue, but which has not been executed and/or for which a response has not yet been received from the server.

In an embodiment, RPC process 10 may classify 114 the generated remote procedure call as unique when the generated remote procedure call is not a duplicate of another pending remote procedure call. That is, if no duplicate pending remote procedure calls are identified on the RPC queue, then the generated remote procedure call may be classified 114 as unique. In a generally corresponding manner, RPC process 10 may also classify 116 the generated remote procedure call a duplicate when the generated remote procedure call is a duplicate of another pending remote procedure call. That is, if RPC process 10 evaluates 112 the generated remote procedure call and determines that the generated remote procedure call is a duplicate of one, or more than one, pending requests on the RPC queue, RPC process 10 may classify 116 the generated remote procedure call as a duplicate. As such, each request added to the RPC queue may be classified as either a unique request, or as a duplicate request.

Identifying 102 the set of duplicate remote procedure calls may include identifying that a remote procedure call is a duplicate of another pending remote procedure call on the RPC queue (e.g., based upon and/or resulting in classifying 116 the generated remote procedure call as a duplicate), and identifying which one, or ones, of the other pending remote procedure calls the remote procedure call is a duplicate of. The identified 102 set of duplicate remote procedure calls may include all of the pending remote procedure calls on the RPC queue that are equivalent to one another. RPC process 10 may associate 104 each remote procedure call within the identified 102 set of duplicate remote procedure calls with one another. As such, RPC process 10 may have an awareness of which pending requests are equivalent to one another. In an embodiment, RPC process 10 may associate 104 each duplicate remote procedure call with one another so as to link each duplicate to the original RPC or otherwise associate the duplicate remote procedure calls. RPC process 10 may associate 104 each duplicate remote procedure call with one another in any suitable manner, e.g., via look-up table, a directory, an indicator associated with each duplicate request, or in any other suitable manner.

RPC process 10 may execute 106 a remote procedure call of the set of duplicate remote procedure calls. That is, RPC process 10 may execute 106 one request from the set of duplicate remote procedure calls, while the other members of the set of duplicate remote procedure calls may wait for execution of the one request. Executing 106 the remote procedure call of the set of duplicate remote procedure calls may include transmitting 118 the remote procedure call to a remote server. In response to the transmitted 118 remote procedure call, the server may access the requested information, execute the requested procedure, or otherwise fulfill the request. Further, the server may reply with the requested data, e.g., which may be transmitted from the server back to the requesting client.

In an embodiment, the request having the highest priority (e.g., by virtue of being the first one of the duplicate requests queued 110, by virtue of being ranked as a higher priority request, by virtue of having already been executed and awaiting a response from the server, or the like) may be executed 106, while the remaining remote procedure calls of the set of duplicate remote procedure calls may wait for the execution of the highest priority request. According to various embodiments, the duplicate remote procedure calls waiting for the execution of the highest priority request of the set of duplicate remote procedure calls may be maintained on the RPC queue, but may be identified as being non-actionable requests (e.g., requests that should not be executed). In various additional and/or alternative embodiments, the duplicate remote procedure calls that are not to be executed (e.g., because they are not the highest priority request of the set of duplicate remote procedure calls), may be removed from the RPC queue, and, for example, placed in a queue for duplicate requests, and/or otherwise managed. Various other implementations may also be utilized.

As generally discussed above, in some embodiments, RPC process 10 may manage both foreground requests and background requests. Generally, each foreground request may be given priority over all background requests. As also discussed above, accounting mechanisms may be implemented to reduce the occurrence of, and/or prevent, progress starvation with respect to the background requests. Further, each foreground request may generally be executed 106 in an order based upon the RPC queue, and/or based upon an order determined according to one or more priority rules. In some situations a background request may reside on the RPC queue, and a subsequently generated foreground request may be added to the RPC queue, in which the subsequently added foreground request may be equivalent to the background request. The RPC process 10 may identify a duplicate remote procedure call set including the background request and the foreground request. According to various embodiments, even though the background request was added to the RPC queue earlier than the foreground request, RPC process 10 may execute 106 the foreground request, e.g., as being a higher priority request, while the background request may await the execution of the foreground request. In some embodiments, RPC process 10 may cancel, or skip, execution of the background request, entirely. For example, as a process giving rise to the background request is not actively awaiting a response to the request (e.g., the background request may be a request for information that is anticipate to possibly be required in the future), execution of the background request may not be necessary in view of the duplicate foreground request (e.g., as the data in response to the foreground request may be maintained in a local cache on the client, and may, therefore, be accessible to the process that generated the background request should the information actually be required at a later time). In some embodiments, when the foreground request is queued 110, and evaluated 112 as being a duplicate of the background request, the background request may be promoted in priority for execution 106, e.g., given the higher priority nature of the later-occurring foreground request that is a duplicate of the background request. In one such implementation, promotion of the background request may allow the first remote procedure call (e.g., the background request) of the set of duplicate remote procedure calls (e.g., including the background request and the foreground request) to be executed 106, such that a timely response to the foreground request may be obtained. In a further example embodiment, including an earlier queued background request and a later queued duplicate foreground request, the background request may already be in progress (e.g., the request may currently be in the process of being transmitted 118 to the server, may have already been transmitted 118 to the server and awaiting a reply, etc.). In such a situation, the foreground request may be held (e.g., not executed), as the duplicate background request may already be in progress. It will be appreciated that various additional and/or alternative implementations for managing duplicate background and foreground requests may be utilized.

RPC process 10 may provide 108 a response for the remote procedure call of the set of duplicate remote procedure calls to the other remote procedure calls of the set of duplicate remote procedure calls. For example, in response to one of the requests in the set of duplicate remote procedure calls being executed 106, a response may be received from the server, in which the response may include the requested data. The requested data may be the same data requested by each remote procedure call included within the set of duplicate remote procedure calls. RPC process 10 may provide 108 the requested data to each remote procedure call included within the list of duplicate remote procedure calls. As such, each of the duplicate remote procedure calls may be satisfied by the response to the one executed remote procedure call. In an embodiment, the response for the remote procedure call may be provided 108 to each of the remote procedure calls of the set of duplicate remote procedure calls by virtue of each of the duplicate remote procedure calls being associated 104 with one another. That is, on the basis of the duplicate remote procedure calls being associated 104 with one another, RPC process 10 may be capable of identifying each remote procedure call of the set of duplicate remote procedure calls, and may, accordingly, provide 108 each of the remote procedure calls with the appropriate response.

Consistent with the foregoing, according to various embodiments, the present disclosure may provide de-duplicating/merging of duplicate remote procedure calls on the client (at which the remote procedure calls may originate). In some embodiments, the present disclosure may use a duplicate detection mechanism and queuing mechanism on the client to de-duplicate (e.g., merge) multiple equivalent RPCs, so that the client may only send the equivalent RPC once. In some embodiments, all duplicate requests may wait for the first request to complete. Further, all equivalent requests may receive copies of the same response from the server. In some embodiments, the approach of the present disclosure may save network bandwidth (e.g., by reducing number of RPCs sent over the network) and may save time (e.g., as only one reply is needed, and so all the other requests do not need to wait for their own individual reply from the server). In some embodiments, the present disclosure may also help the client maintain a strict ordering of RPC replies, for example, by removing duplicates the client may process the RPCs in a reliable order of queuing, for the client's perspective, e.g., instead of an order that may be based on server replies, which may arrive in a different order.

In some embodiments, the present disclosure may detect pending duplicate requests and notify caller of a duplicate (and, if appropriate to, skip the work). Further, in some embodiments, the present disclosure may allow a caller to wait for previous request to execute, then share the original's results or to skip execution completely if a duplicate is in progress. In some embodiments, this may be achieved by detecting and linking duplicate requests. If multiple callers simultaneously try the same operation, all but one of them may be allowed to wait for the one distinguished "first request", and may share that request's results. Each type of operation may provide an equivalence operator that may classify a request as unique or duplicate of an existing (queued or in-progress) request. Unique requests may be queued for execution by a thread pool. Duplicate requests are linked directly to the queued "first request." In some implementations, there may be no chain of dependencies associated with the duplicate requests. When the first request completes, all duplicates requests may receive the same results.

According to some implementations, the present disclosure may segregate requests into foreground and background requests, and may account for them separately to give foreground requests priority over background requests, yet to allow a queued background request to provide results for equivalent foreground requests. For example, a foreground requests that is equivalent to a background request may wait on a background that "started first", or the foreground request can execute the operation (if it's "first"). Further, in some embodiments, a thread pool may be used to service foreground and background requests, using careful accounting to prevent starvation of progress. For example, in some embodiments, at least one thread may be working on background requests, which never block on any other queued requests. As such, any request dependent on a background request will eventually get completed.

Consistent with the foregoing, in some embodiments, the present disclosure may provide convenience for a client program. For example, some embodiments may allow the client to handle foreground requests (e.g., the foreground request may wait on a background that "started first", or can execute the operation if the foreground request is "first". In some embodiments, the client may "fire and forget" background requests. For example, the present disclosure may look for duplicates, and if there are none, the system may queue the request for processing by the thread pool. According to some embodiments, the present disclosure may be deadlock- and starvation-free. For example, in some embodiments the present disclosure may ensure there is no deadlock or starvation by using careful accounting of thread pool, and atomic operations to protect its data structures when creating requests/scanning for existing requests that are duplicates. Various additional and/or alternative features may be provided by various embodiments consistent with the present disclosure.

Figure 3:
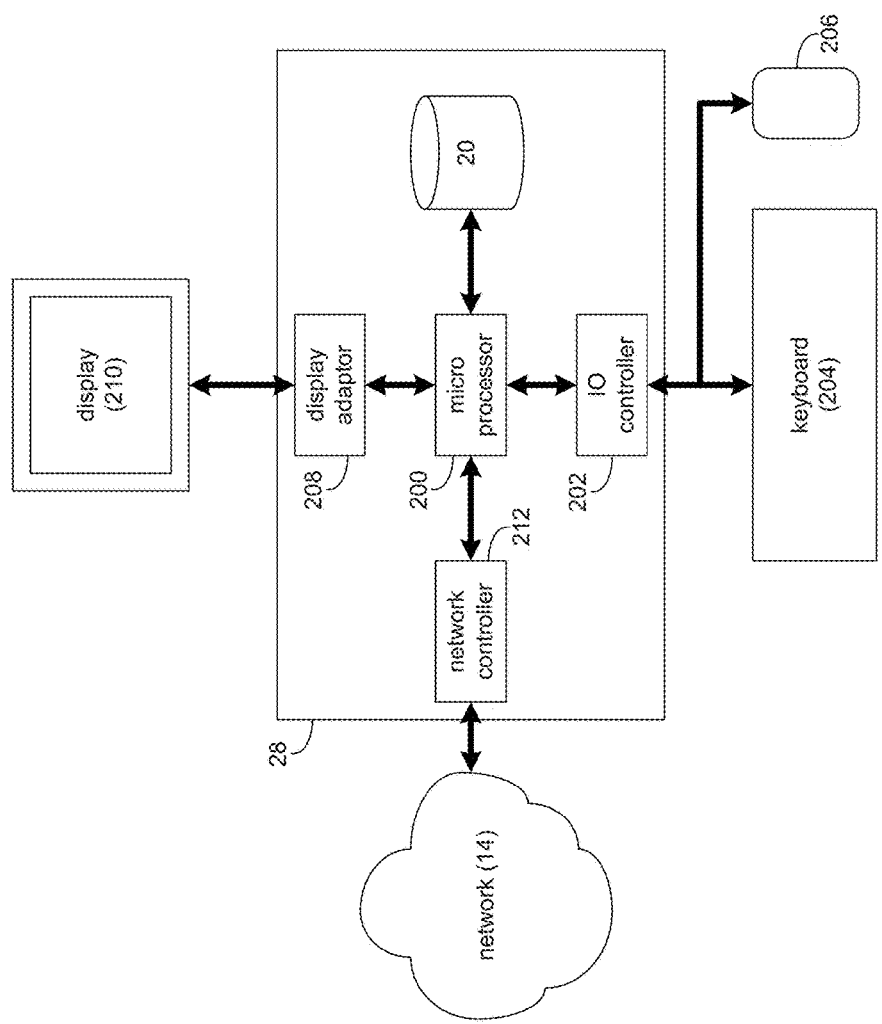
FIG. 3 is a diagrammatic view of the computing device of FIG. 1, according to an implementation of the present disclosure.

Referring also to FIG. 3, there is shown a diagrammatic view of computing system 28. While computing system 28 is shown in this figure, this is for illustrative purposes only and is not intended to be a limitation of this disclosure, as other configuration are possible. For example, any computing device capable of executing, in whole or in part, RPC process 10 may be substituted for computing device 28 within FIG. 3, examples of which may include but are not limited to client electronic devices 12, 30, 32, 34.

Computing system 28 may include microprocessor 200 configured to e.g., process data and execute instructions/code for screen capture process 10. Microprocessor 200 may be coupled to storage device 20. As discussed above, examples of storage device 20 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

The invention claimed is:

1. A computer-implemented method comprising:
generating, on a processor, a plurality of local pending remote procedure calls;
identifying, on the processor, a set of duplicate remote procedure calls among the plurality of remote procedure calls based upon, at least in part, determining that equivalent data that will be returned in response to each of the plurality of remote procedure calls, wherein at least one of the remote procedure calls of the set of duplicate remote procedure calls is a foreground request and at least one of the remote procedure calls of the set of duplicate remote procedure calls is a background request;
associating, on the processor, each remote procedure call within the set of duplicate remote procedure calls with one another;
executing, on the processor, a remote procedure call of the set of duplicate remote procedure calls, wherein executing the remote procedure call of the set of duplicate remote procedure calls includes selecting a representative remote procedure call from the set of duplicate remote procedure calls to execute while other members of the set of duplicate remote procedure calls wait for the execution of the representative remote procedure call,
wherein at least one of the foreground request is given priority over the background request even in the event where the background request was added earlier to the queue, and the background request is given priority over the foreground request even in the event where the foreground request was added earlier to the queue,
wherein, if the remote procedure call of the set of duplicate remote procedure calls is maintained in a local cache and the remote procedure call is accessible to the processor that generated the remote procedure call, then the remote procedure call of the set of duplicate remote procedure calls is not executed; and
providing, on the processor, a response for the remote procedure call of the set of duplicate remote procedure calls to the other remote procedure calls of the set of duplicate remote procedure calls.

2. The computer-implemented method of claim 1, further comprising:
queuing each generated remote procedure call in a queue for execution by a thread pool.

3. The computer-implemented method of claim 1, wherein identifying the set of duplicate remote procedure calls includes evaluating a generated remote procedure call of the plurality of remote procedure calls to determine if the generated remote procedure call is a duplicate of another pending remote procedure call.

4. The computer-implemented method of claim 3, further comprising:
classifying the generated remote procedure call as unique when the generated remote procedure call is not a duplicate of another pending remote procedure call; and
classifying the generated remote procedure call a duplicate when the generated remote procedure call is a duplicate of another pending remote procedure call.

5. The computer-implemented method of claim 1, wherein executing the remote procedure call of the set of duplicate remote procedure calls includes transmitting the remote procedure call to a remote server.

6. A computer program product comprising a non-transitory computer readable medium having a plurality of instructions stored on it, which, when executed by a processor cause the processor to perform operations comprising:

generating a plurality of local pending remote procedure calls;
   identifying a set of duplicate remote procedure calls among the plurality of remote procedure calls based upon, at least in part, determining that equivalent data that will be returned in response to each of the plurality of remote procedure calls, wherein at least one of the remote procedure calls of the set of duplicate remote procedure calls is a foreground request and at least one of the remote procedure calls of the set of duplicate remote procedure calls is a background request;
   associating each remote procedure call within the set of duplicate remote procedure calls with one another;
   executing, on the processor, a remote procedure call of the set of duplicate remote procedure calls, wherein executing the remote procedure call of the set of duplicate remote procedure calls includes selecting a representative remote procedure call from the set of duplicate remote procedure calls to execute while other members of the set of duplicate remote procedure calls wait for the execution of the representative remote procedure call,
      wherein at least one of the foreground request is given priority over the background request even in the event where the background request was added earlier to the queue, and the background request is given priority over the foreground request even in the event where the foreground request was added earlier to the queue,
      wherein, if the remote procedure call of the set of duplicate remote procedure calls is maintained in a local cache and the remote procedure call is accessible to the processor that generated the remote procedure call, then the remote procedure call of the set of duplicate remote procedure calls is not executed; and
   providing a response for the remote procedure call of the set of duplicate remote procedure calls to the other remote procedure calls of the set of duplicate remote procedure calls.

7. The computer program product of claim 6, further comprising instructions for:
   queuing each generated remote procedure call in a queue for execution by a thread pool.

8. The computer program product of claim 6, wherein the instructions for identifying the set of duplicate remote procedure calls include instructions for evaluating a generated remote procedure call of the plurality of remote procedure calls to determine if the generated remote procedure call is a duplicate of another pending remote procedure call.

9. The computer program product of claim 8, further comprising instructions for:
   classifying the generated remote procedure call as unique when the generated remote procedure call is not a duplicate of another pending remote procedure call; and
   classifying the generated remote procedure call a duplicate when the generated remote procedure call is a duplicate of another pending remote procedure call.

10. The computer program product of claim 6, wherein the instructions for executing the remote procedure call of the set of duplicate remote procedure calls include instructions for transmitting the remote procedure call to a remote server.

11. A computing system comprising:
a processor device; and
a memory architecture coupled with the processor device;
wherein the processor device is configured for:
   generating a plurality of local pending remote procedure calls;
   identifying a set of duplicate remote procedure calls among the plurality of remote procedure calls based upon, at least in part, determining that equivalent data that will be returned in response to each of the plurality of remote procedure calls, wherein at least one of the remote procedure calls of the set of duplicate remote procedure calls is a foreground request and at least one of the remote procedure calls of the set of duplicate remote procedure calls is a background request;
   associating each remote procedure call within the set of duplicate remote procedure calls with one another;
   executing, on the processor, a remote procedure call of the set of duplicate remote procedure calls, wherein executing the remote procedure call of the set of duplicate remote procedure calls includes selecting a representative remote procedure call from the set of duplicate remote procedure calls to execute while other members of the set of duplicate remote procedure calls wait for the execution of the representative remote procedure call,
      wherein at least one of the foreground request is given priority over the background request even in the event where the background request was added earlier to the queue, and the background request is given priority over the foreground request even in the event where the foreground request was added earlier to the queue,
      wherein, if the remote procedure call of the set of duplicate remote procedure calls is maintained in a local cache and the remote procedure call is accessible to the processor that generated the remote procedure call, then the remote procedure call of the set of duplicate remote procedure calls is not executed; and
   providing a response for the remote procedure call of the set of duplicate remote procedure calls to the other remote procedure calls of the set of duplicate remote procedure calls.

12. The computing system of claim 11, wherein the processor device is further configured for:
   queuing each generated remote procedure call in a queue for execution by a thread pool.

13. The computing system of claim 11, wherein the processor device configured for identifying the set of duplicate remote procedure calls is further configured for evaluating a generated remote procedure call of the plurality of remote procedure calls to determine if the generated remote procedure call is a duplicate of another pending remote procedure call.

14. The computing system of claim 13, wherein the processor device is further configured for:
   classifying the generated remote procedure call as unique when the generated remote procedure call is not a duplicate of another pending remote procedure call; and
   classifying the generated remote procedure call a duplicate when the generated remote procedure call is a duplicate of another pending remote procedure call.

* * * * *